Nov. 29, 1966     S. M. WHEATON     3,288,187
CAR FLOOR TRAY
Filed March 10, 1965
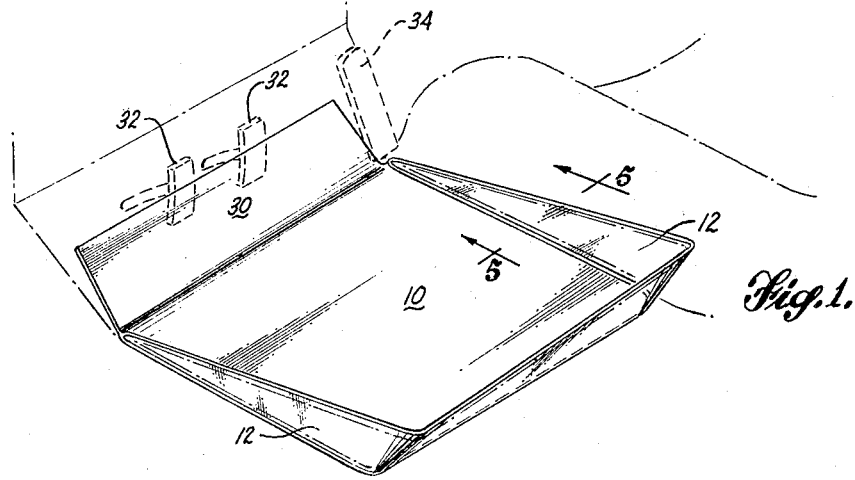
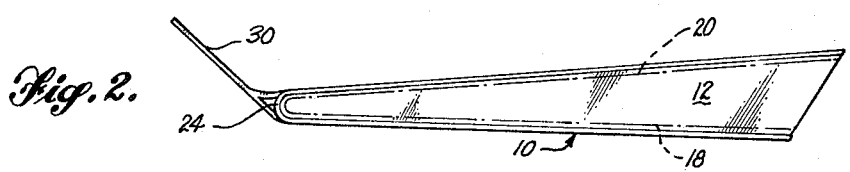
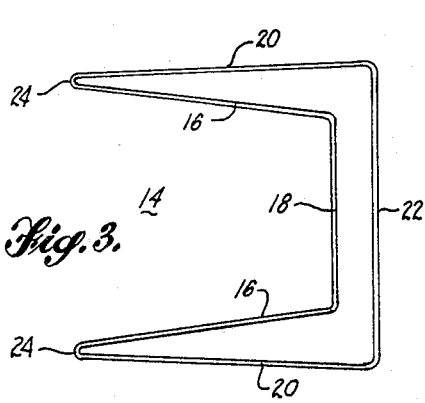
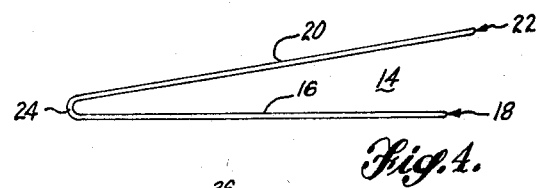
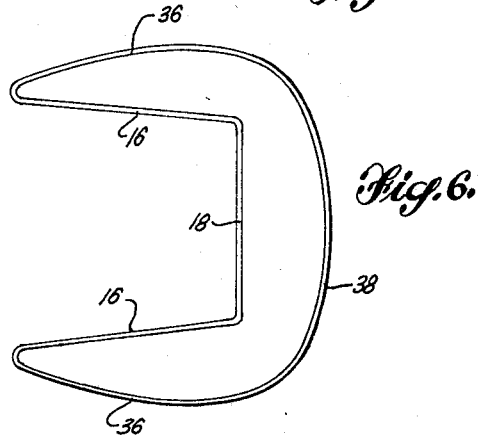
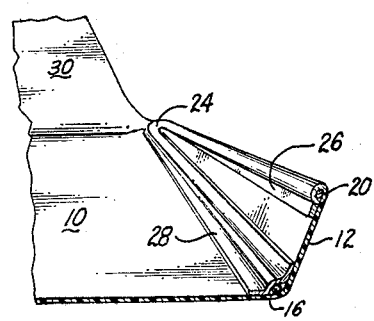
INVENTOR.
SHERMAN M. WHEATON
BY    Ford E. Smith
ATTORNEY

United States Patent Office 3,288,187
Patented Nov. 29, 1966

3,288,187
CAR FLOOR TRAY
Sherman M. Wheaton, 1530 Nelchina St.,
Anchorage, Alaska
Filed Mar. 10, 1965, Ser. No. 438,539
4 Claims. (Cl. 150—.5)

The present invention relates to a car floor tray for collecting snow, water, dirt and the like and, more particularly, to a tray-like mat to be placed on the floor of a car forwardly adjacent a seat in the area generally occupied by a passenger's feet.

When snowy, wet, or muddy conditions prevail in an area where an automobile is operated the floor in front of the seat and particularly the floor adjacent the driver's seat tends to accumulate snow, moisture, mud, dirt and like debris in a particularly objectionable manner. As a result the carpeting usually becomes dirty and wet to such an extent that its life is materially shortened.

The principal object of this invention is to provide a car floor tray which is particularly useful for carpeted car floors to collect tracked in snow, moisture, dirt and the like. Another object is to provide a car floor tray which is easily inserted into place; which is adapted to stay in place once disposed in its operable position; and which may be removed from the automobile and dumped without spillage of the collected water and the like.

A further object of this invention is to provide a car floor tray which is resiliently held in place and may be installed and removed without necessitating the operation of fastening devices or other retaining means.

Still another object of the invention is to provide a car floor tray which is simple and easy to construct, may be collapsed into a flat configuration to avoid bulk during shipment, and which when uncollapsed or erected, is capable of holding itself in place in an automobile due to tension incorporated into the tray.

These and other objects of the invention will become more apparent as the description proceeds. The invention comprises the elements and features hereafter fully described and particularly pointed out in the subjoined claims all with reference to the accompanying drawing. It will be obvious to those skilled in the art that the following disclosure in detail sets forth the invention in a preferred form but it will be likewise apparent that there are one or more other ways in which the invention may be practiced. It is intended that all forms of the invention as specifically stated herein and all the reasonable equivalents of the form of the invention disclosed and claimed herein shall be protected.

In the accompanying drawing:

FIGURE 1 is a perspective view of the car floor tray as it would appear in use;

FIGURE 2 is a view in side elevation of the car floor tray;

FIGURE 3 is a plan view of the frame of the car floor tray;

FIGURE 4 is a side elevation view of the frame of FIGURE 3;

FIGURE 5 is a fragmentary perspective view partially in cross section taken on the line 5—5 of FIGURE 1; and FIGURE 6 is a plan view of a modified form of frame for the car floor tray.

In general the car floor tray of this invention includes a substantially rectangular mat panel formed of flexible plastic sheet material. Ordinarily the size of this panel is sufficient to cover the floor area forwardly adjacent a car seat. If the automobile is one in which there is a tunnel or raised ridge running the length of the interior of the automobile the floor area will be divided into two wells.

Under such circumstances the present car floor tray would be produced in a size to fit the foot well on either side of the tunnel either for the forward or rear seats. If the automobile to be equipped is without a tunnel the frame would be made of a width to extend completely across the floor area. Thus the passengers of either the front seat or the rear seat would use a single tray.

A flexible plastic sheet material flange is supplied along the sides and across the rear of the mat panel and is secured thereto in a watertight manner. A resilient wire frame is incorporated into the mat panel and its flange so that the periphery of the flange is anchored to one portion of the wire frame and another portion of the wire frame extends the line of joinder between the mat panel and its flange. Preferably the frame is C-shaped in plan and tensed to expand outward, in other words, so that its arms tend to spread. The tension supplied by the frame tautens the mat panel and the flange. The frame is also capable, due to its inherent resilience, of being collapsed into a flat, practically two-dimensional configuration for shipment and storage. However, when it is unrestrained it will assume a three-dimensional configuration.

More specifically and with reference to the accompanying drawings the mat panel 10, substantially rectangular shape, is bounded on its side and rear edges by the flange wall 12 which is generally C-shaped. In an automobile the frame is disposed with its open end forward. The mat panel 10 and the flange 12 are formed of flexible plastic sheet material of which vinyl or polyethylene sheets are typical examples. It will be understood that there are numerous such sheets and films available that may be used, sheet rubber material, rubberized fabric and the like being further examples.

In the car floor tray the frame, designated as a whole by the numeral 14, is formed of resilient wire desirably of a small gauge and having a marked degree of strength and resilience. There is a first and lower U-shaped frame member comprising sides 16 and end 18 as may be seen in FIGURE 3. A second and upper somewhat larger U-shaped wire frame member comprises sides 20 and end 22. The forward ends of the juxtaposed side 16 and 20 of the two frames are joined by U-bends 24.

The configuration of the frame from the side is generally that of a hairpin. By reason of the shape and outward bias of the bends 24, the upper frame assumes a relationship to the lower frame as is indicated in FIGURE 4 in that sides 20 generally slope upward from the U-bends 24. Because sides 20 are usually longer than sides 16 the cross member 22 is disposed above and outward of the cross member 18. Likewise it will be noted that the sides 20 generally tend to flare outward as they progress from the U-bends 24 whereas the sides 16 of the lower frame tend to converge as they progress from the U-bend 24. Thus, when the flexible plastic sheet material is secured between these two parts of the frame it assumes an outward flared shape as shown in FIGURES 1 and 5.

Desirably the upper edge of flange 12 is folded over the sides 20 and down upon itself where it may be adhesively or otherwise secured forming a seam 26 within which is located the side member 20. At the line of joinder between the floor mat panel 10 and the flange 12 at the sides is located the frame sides 16 and the frame end 18. A narrow strip 28 of tape or of flexible sheet material of the same nature as forms the mat panel is secured adhesively or otherwise as shown in FIGURE 5 in such manner as to span the wire of the lower frame. Of course, strip 28 may similarly be attached to the outside of this line of joinder. It is desirable that this joint be watertight and that it be sufficiently secure that it holds the frame to the sheet material or vice-versa.

In a desirable form of the invention the mat panel 10 has an extension 30 in the nature of a flap that may be disposed on the inclined forward portion of the car floor in the region of the foot pedals 32 and of the accelerator pedal 34.

The alternative form of the frame shown in FIGURE 6 follows the frame 14 of FIGURE 3 in general configuration except that the sides 36 and end 38 are arranged in a somewhat more curved shape and possibly are disposed at a greater height and greater extension relative the lower frame. The frame of FIGURE 6, it will be understood, will be provided with a mat panel and flange both formed of plastic sheet material as described.

It will now be appreciated that a car floor tray has been provided which may be conveniently installed both in existing and new model vehicles with a minimum amount of effort and without the necessity of fastening devices. The arms of the resilient frame members in this car floor tray are tensed or biased outward in such manner that they will tauten the mat panel. Also they will press outward against the sides of the foot wells of the vehicle. Likewise the arms 16 and 20 by reason of the tension of the U-bend 24 are biased so that they tend to stand apart and stretch and tauten the material forming the flange 12.

When the frame of the tray is to be collapsed or compacted into a flat plane, pressure applied to the upper frame tends to cause the U-bends 24 to revolve outward applying torsional force to the arms of the lower frame elements. The flat configuration requires restraint to be maintained as in a thin carton. If it is desired to store or ship many they of course may be nested or stacked in three dimensional form.

When it is desired to remove the tray from a car, it may be grasped by means of the flanges on opposite sides. If at the same time the sides are pressed together, the mat panel will sag and form a cupped depression which will hold any water, dirt, gravel or the like and prevent spilling. In addition to serving as a collection means this mat tray also functions as a waterproof cover for any underlying carpeting.

Having thus described my invention, I claim as new and desire to secure by Letters Patent:

1. A car floor tray for collecting snow, water, dirt and the like, comprising:
    an outwardly tensed C-shaped resilient wire floor frame generally shaped to conform to the side and rear margins of a car floor area occupied by a passenger's feet;
    a larger outwardly tensed C-shaped resilient wire flange frame overlying said floor frame in upward and outward spaced relation;
    said floor frame and said flange frame being flexibly joined at their forward ends by integral U-bends;
    said flange frame overlying said floor frame in upward and outward spaced relation;
    a mat panel secured at its edges to said floor frame and extending therebetween;
    a flange panel secured along its outer edges to said flange frame and along its inner edges to said mat panel in a water tight manner; and
    said mat panel and flange panel being formed of flexible plastic sheet material.

2. The structure according to claim 1 in which there is an integral flexible flap extending from the forward edge of said mat panel.

3. A car floor tray for collecting snow, water, dirt and the like, comprising:
    a generally rectangular mat panel formed of flexible plastic sheet material of a size to generally cover the floor area forwardly adjacent a car seat;
    flexible plastic sheet material forming a flange along the sides and across the rear of said mat panel and secured thereto in a water tight manner; and
    resilient wire frame means anchored to and extending along the periphery of said flange and along the line of joinder of said flange with said mat panel, said frame means being biased to stretch said mat panel and flange.

4. A car floor tray, comprising:
    flexible sheet plastic means forming a mat panel adapted to substantially cover the floor area forwardly adjacent a car seat and including an upstanding flange integrally joined to the sides and rear of said panel;
    a generally C-shaped, outwardly biased, resilient wire frame having a first portion fixedly secured to said mat panel and flange adjacent the line of joinder and a second portion fixedly secured to said flange in juxtaposed spaced apart relation to said first portion; and
    said first and second frame portions being forwardly joined by means biasing the same to spread apart to hold said flange erect relative said mat panel.

References Cited by the Examiner
UNITED STATES PATENTS 2,785,725  3/1957  Gold _____ 150—51

FOREIGN PATENTS 1,322,948  2/1953  France.

FRANKLIN T. GARRETT, *Primary Examiner.*